United States Patent [19]

Ball, Jr. et al.

[11] 3,738,183

[45] June 12, 1973

[54] COMBINATION DRIVE FOR VALVE OPERATOR

[75] Inventors: Russell C. Ball, Jr., Malvern; Walter J. Denkowski, King of Prussia; Kenneth Wadsworth, Royersford, all of Pa.

[73] Assignee: Philadelphia Gear Corporation, King of Prussia, Pa.

[22] Filed: Feb. 1, 1971

[21] Appl. No.: 111,451

[52] U.S. Cl............ 74/89.15, 74/424.8 R, 251/134
[51] Int. Cl........................................... F16h 27/02
[58] Field of Search...................... 74/89.15, 424.8, 74/424.8 VA, 625, 10.2; 251/161, 163, 164, 229, 133, 134

[56] References Cited
UNITED STATES PATENTS

| | | | |
|---|---|---|---|
| 3,266,333 | 8/1966 | Maroth | 74/424.8 R |
| 3,220,431 | 11/1965 | Morrell | 251/134 |
| 2,860,266 | 11/1958 | Schrader | 251/133 |
| 2,459,682 | 1/1949 | Carrie | 251/163 |
| 3,505,888 | 4/1970 | Denkowski | 251/133 |

*Primary Examiner*—William F. O'Dea
*Assistant Examiner*—Wesley S. Ratliff, Jr.
*Attorney*—Paul & Paul

[57] ABSTRACT

A valve operator for closing a globe valve against heavy back pressure has two different types of drives. The two drives are used in succession. A first type of drive is used for moving the valve stem lengthwise to move the globe valve between open position and an almost-closed position. A second type of drive is used to move the valve between the almost-closed and fully closed positions. The first type of drive includes a rotatable nut threaded on the valve stem, and drive means for rotating the nut. The second type of drive involves a roll-ramp assembly which, when driven rotationally, exerts an axial thrust against the nut and moves the nut without rotation thereof in the axial direction of the valve stem, moving the stem with it. The roll-ramp assembly includes a cam sector driven angularly through a part of a revolution to force a set of rollers up inclined ramps to increase the axial spacing between the rotatable cam sector and a fixed cam plate. While a typical use for the valve operator is for globe valves, the operator is equally applicable to gate valves, sluice valves, or other types of applications requiring linear movement and forces of great magnitude.

7 Claims, 7 Drawing Figures

INVENTOR.
RUSSELL C. BALL, JR.
WALTER J. DENKOWSKI
BY KENNETH WADSWORTH

Paul & Paul
ATTORNEYS.

COMBINATION DRIVE FOR VALVE OPERATOR

BACKGROUND OF THE INVENTION

It is well known to provide a valve operator in which an externally threaded stem is moved in its lengthwise directions by driving rotationally a nut which is fixed in the housing against movement in the lengthwise direction of the stem. Rotation of the nut in one direction or the other causes the non-rotating stem to move up or down to open or close the valve.

In some installations, as, for example, in nuclear power generating stations, a very heavy back pressure makes final closing of a globe valve very difficult, and tremendous forces are required to close fully the valve. For example, from one-half million to 2 million pounds of thrust may be required to close a globe valve against a back pressure of 6,000 pounds per square inch. In such cases, final closing of the valve by driving a nut rotationally to move a threaded non-rotating stem lengthwise requires a tremendous amount of driving torque, since the screw principle involved in this type of drive is characterized by very low efficiency, for example, an efficiency of the order of 20-30 percent. Ball screw arrangements which are of higher efficiency are known but such ball screw arrangements are very expensive and frequently are not adaptable to high thrust applications.

SUMMARY OF THE INVENTION

A principal object of the present invention is to provide a valve operator which has the capability of closing a globe valve against very heavy back pressure without requiring as much input power as has heretofore been required.

Another object is to provide a valve operator having very large thrust capabilities and having an efficiency substantially higher than that provided by the non-rotating threaded stem and nut type of drive.

The above, as well as other objects and advantages of the invention, are achieved by providing a combination drive wherein movement of the valve stem between fully open and almost-but-not-quite closed position is performed by a rotationally driven nut and a threaded non-rotating stem type of drive. Movement of the stem between almost-closed and fully closed position is performed by a roll-ramp type of drive in which an annular cam is driven rotationally through a fraction of a complete revolution to drive rollers up inclined ramps but not beyond the crests thereof, thereby to move the nut, without rotation thereof, in the lengthwise direction of the stem, thereby to move the stem lengthwise. Such roll-ramp-assembly type of drive has an efficiency very much higher than that of the rotationally driven nut and threaded stem type of drive. Accordingly, the power required to drive the roll ramp to fully close a valve against high back pressure is substantially less than would have been required if the screw principle were to be utilized to fully close the valve. The efficiency of the roll-ramp assembly may, for example, be of the order of 90 percent. This is in contrast to an efficiency of 20-30 percent where the Acme screw principle type of drive is employed.

DESCRIPTION OF THE PREFERRED EMBODIMENTS

The Screw Drive

Figure 1:
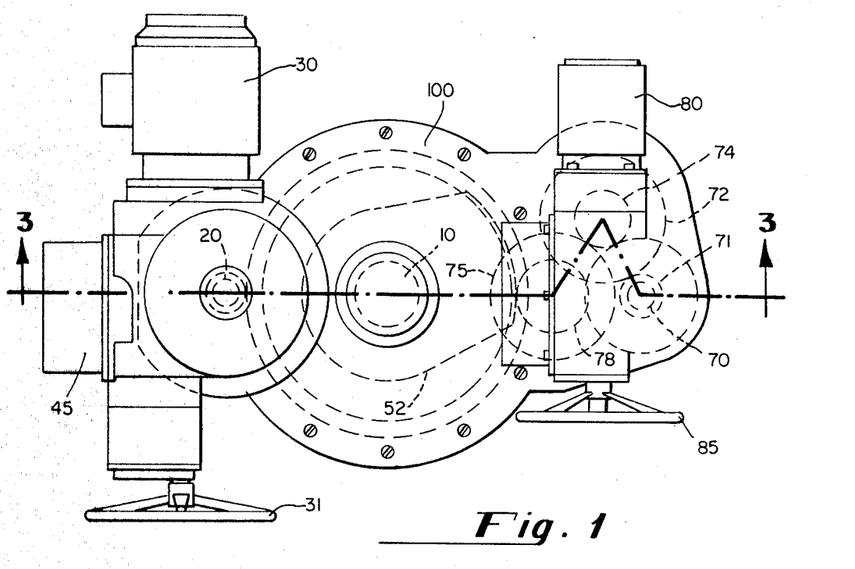
FIG. 1 is a plan view of the valve operator of the present invention showing the housing and the organization of the major component parts.
Figure 2:
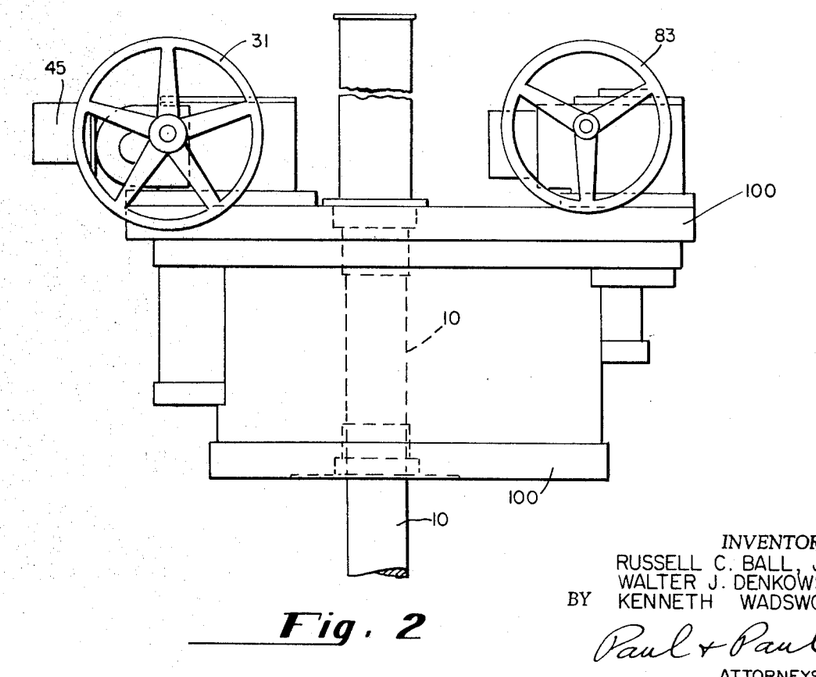
FIG. 2 is an elevational view of the valve operator of FIG. 1.
Figure 3:
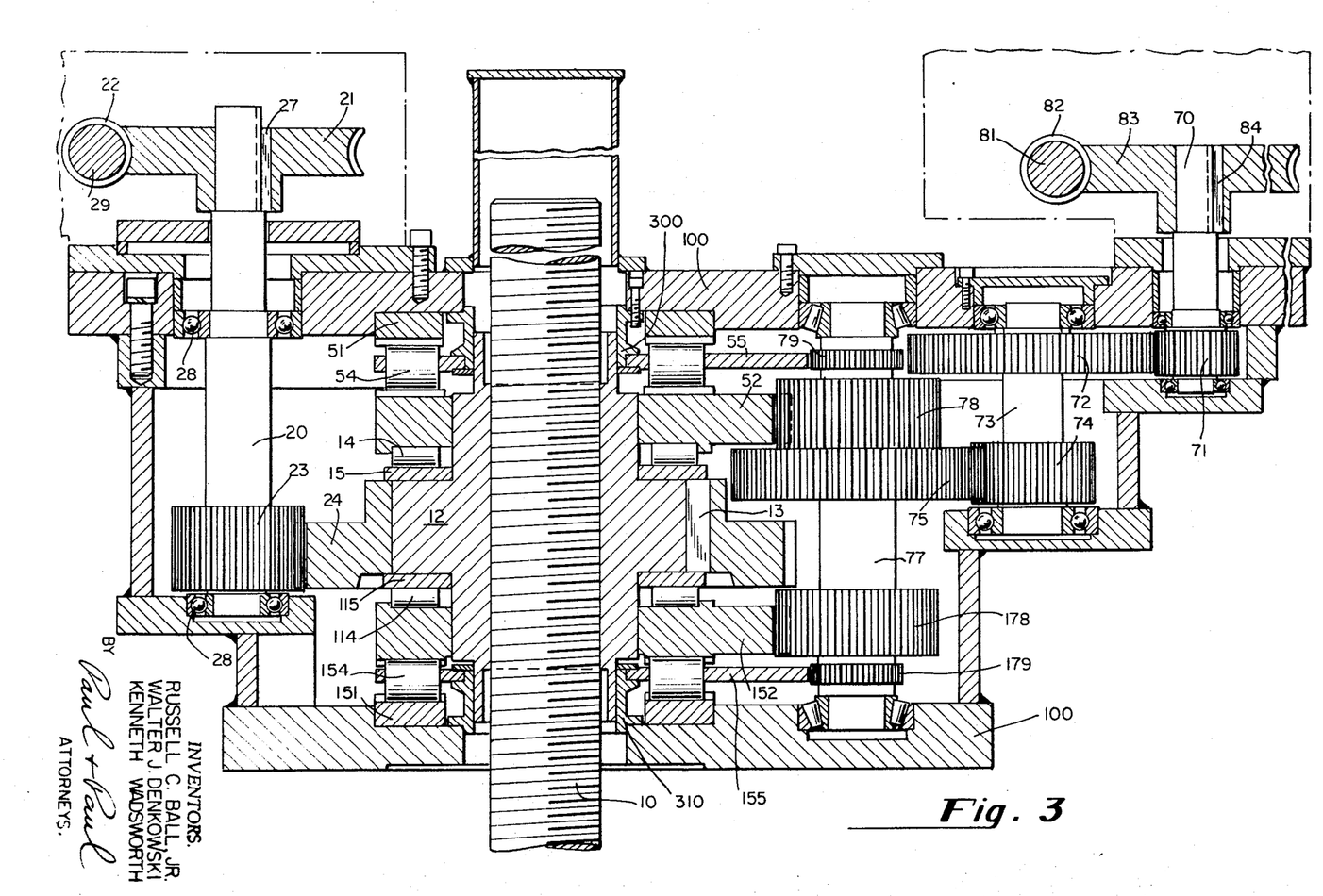
FIG. 3 is a vertical view, in section, along the line 3—3 of FIG. 1.

Referring to FIGS. 1, 2 and 3, an externally threaded stem 10, keyed against rotation by key and key-way not shown, extends vertically through a housing 100. Suitably supported for rotation, as by bearings 28, in housing 100 at the left side thereof as viewed in the drawings, is a vertical input shaft 20 having fixed thereto, as by key 27, a worm gear 21 driven by a worm 22 on a worm shaft 29. Worm shaft 29 is driven through suitable gearing, not shown, by a motor 30 (FIGS. 1 and 2) or the worm shaft 29 may be turned manually, as by handwheel 31, when the power is off.

Fixed to input shaft 20 is a pinion 23 which is in mesh with and drives an annular gear 24 which is fixed, as by a key 13, to a nut 12 threaded on the externally threaded valve stem 10. When nut 12 is driven rotationally, the valve stem 10 is moved in its lengthwise directions, up or down according to the direction of rotation of the nut.

The Counter for the Screw Drive

Figure 4:
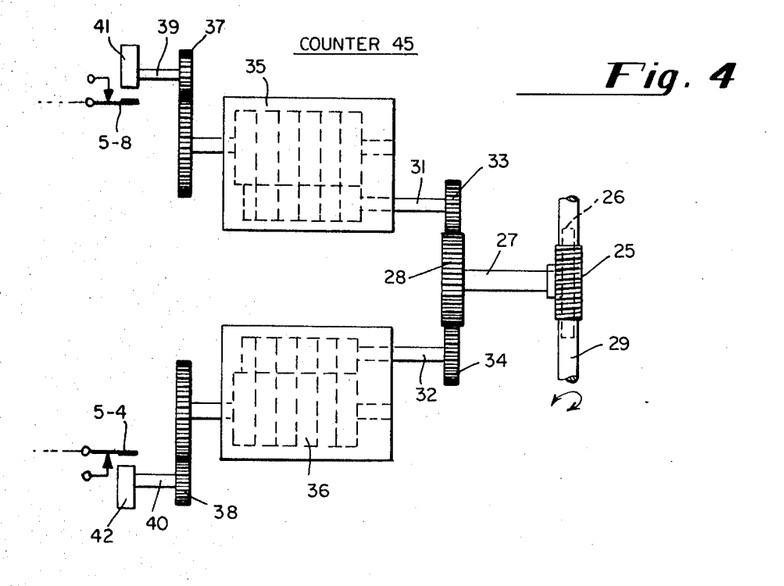
FIG. 4 is a view, partly diagrammatic, of a counter mechanism used in the counting of the number of revolutions of the stem between fully open and almost-closed positions.

Referring now to FIG. 4, worm shaft 29 is provided with a second worm 25 which meshes with and drives a gear 26 fixed to a shaft 27 which extends horizontally at right angles to the horizontal worm shaft 29. Worm 25, gear 26 and shaft 27 drive a counter mechanism 45 which is illustrated diagrammatically in FIG. 4 and which may comprise a pair of parallel shafts 31 and 32 driven in opposite directions by shaft 27 by way of gears 28, 33 and 34. Each of the parallel shafts 31 and 32 drives a train of counter gears identified as 35 and 36, respectively. These trains of counter gears may be similar to those shown and described in U.S. Pat. No. 3,333,477, issued Aug. 1, 1967, to W. J. Denkowski and assigned to the assignee of the present application. The counter trains 35 and 36 drive a pinion, 37 and 38, respectively, fixed to stub shafts 39 and 40, respectively. Fixed to each of the stub shafts 39 and 40 are cams 41 and 42, respectively, which are adapted to actuate switches 5-8 and 5-4, respectively.

The operation of the counter mechanism 45 may be similar to that described in the aforesaid U.S. Pat. No. 3,333,477. Counter train 35 is effective, after a preselected number of revolutions in one direction of the counter drive shaft 27, beginning at a starting or limit position, to move the counter output shaft 39 through 90°, thereby to turn cam 41 through 90° and thereby to actuate an electrical switch 5-8 to shut off the drive motor 30. The other counter train 36 is effective, after the same selected number of revolutions of counter drive shaft 27 in the opposite direction, to drive the counter output shaft 40 through 90°, thereby to turn the cam 42 through 90°, and thereby to actuate an electrical switch 5-4 to shut off the drive motor 30.

It will be understood that one of the counter trains, for example, train 35, is set up and used to actuate switch 5-8 to shut off the motor 30 after the valve stem has been rotated a selected number of revolutions in one direction to move the stem from open to almost-closed position, while the other of the counter trains 36 is used to actuate the switch 5-4 to shut off the motor 30 when the valve stem has been rotated the same number of revolutions in the opposite direction to move the stem lengthwise from almost-closed to fully open position.

It will also be understood that by varying the number of sets of gears in the counter trains 35 and 36, and/or by varying the gear ratios, the number of revolutions of the counter drive shaft 27 required to actuate the counter mechanism may be varied, within relatively wide limits. Moreover, within the range of a particular counter train, the stop limits may be adjusted at any time without removing the counter trains or the device being protected. All of this will be clear from a reading of U.S. Pat. No. 3,333,447.

The Roll-Ramp Drive

To move the valve stem 10 downwardly from almost-closed to fully closed position, and upwardly from fully closed to almost-closed position, the valve operator of the present application is provided with a roll-ramp mechanism, as will now be described. The position of the valve stem at the so-called "almost closed" position will sometimes be referred to herein as the "switch-over" position, since this is the position of the valve stem at which the drive is switched over from one type to the other type.

Supported for rotation in housing 100, on the right side as viewed in FIGS. 1, 2 and 3, is a vertical input shaft 70. Keyed to shaft 70, as by key 84 is a worm gear 83 driven by a worm 82 on a worm shaft 81. Worm shaft 81 is driven by a motor 80, or when the power is off, by a handwheel 85.

Keyed to input shaft 70 is a pinion 71 which drives a gear 72 fixed on a stub shaft 73. Fixed to stub shaft 73 is a pinion 74 which drives a gear 75 fixed to a power shaft 77. Also keyed to power shaft 77 is an upper gear 78 and a lower gear 178. Upper gear 78 is in mesh with and drives an integral upper annular power cam and g ear sector 52 which is free on stem nut 12. Lower gear 178 is in mesh with and drives an integral lower annular power cam gear sector 152 which is free on stem nut 12. The annular portions of each of the power cam gear sectors 52 and 152 may, for example, be provided with three inclines and three declines as illustrated diagrammatically in FIG. 5, later to be described.

Figures 5, 7:
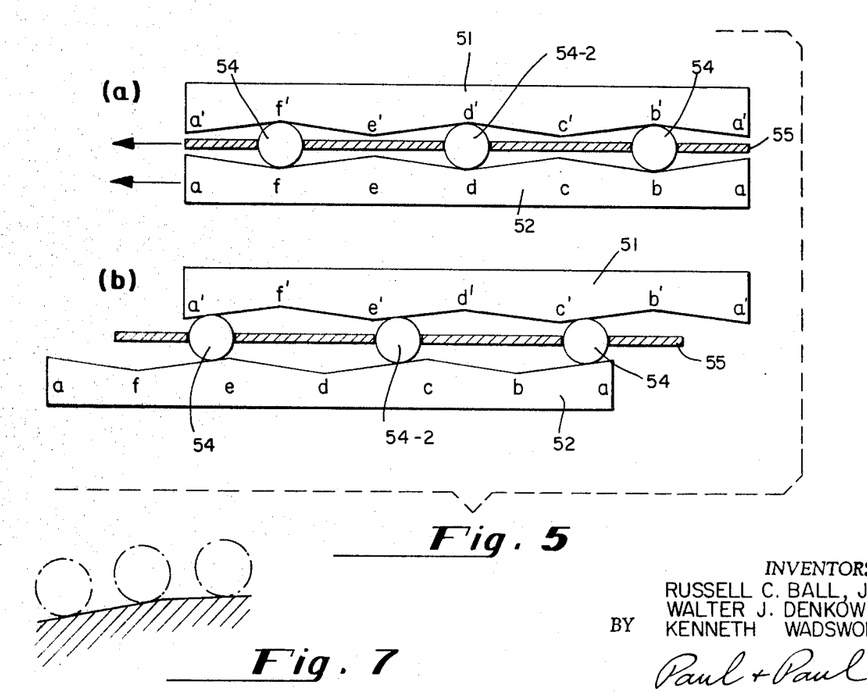
FIG. 5 is a diagrammatic illustration of the action of the roll-ramp mechanism.
FIG. 7 is a diagram illustrating a preferred contour for the cam slope.

Also keyed on power shaft 77 is an upper gear 79 of substantially smaller diameter than upper gear 78. Gear 79 meshes with and drives an integral upper annular roller-retainer and gear sector 55 mounted free on stem nut journal 300 above the upper power cam 52. Retained in the annular portion of retainer 55 are three rollers 54 disposed at 120° spacing about the axis of stem 10. Mounted above the roller retainer 55 and rollers 54 is a stationary annular cam 51 having three inclines and three declines, as seen in FIG. 5.

Also keyed on power shaft 77 is a lower gear 179 of substantially smaller diameter than lower gear 178. Gear 179 meshes with and drives an integral lower annular roller-retainer and gear sector 155 mounted free on stem nut journal 310 below the power cam 152. Retained in the annular portion of lower retainer 155 are three rollers 154 disposed at 120° spacing about the axis of stem 10. Mounted below the lower retainer 155 and rollers 154 is a stationary annular cam 151 having three inclines and three declines.

In the illustrated embodiment, each roll-ramp cam has three pairs of inclines and declines. Thus, each pair occupies 120°, and the rollers are accordingly at 120° spacing. Other spacings could, of course, be used.

The Roll-Ramp Mechanism

The roll-ramp mechanism is basically similar to that shown in U.S. Pat. No. 3,369,423, issued Feb. 20, 1968 to J. M. Hamilton et al. and assigned to the assignee of the present invention. There are, however, several differences between the roll-ramp mechanism shown in the present application and that shown in U.S. Pat. No. 3,369,423. One difference is that in the roll-ramp mechanism of the present application, at the upper mechanism (consisting of cam and roller elements 52, 54 and 51) and also at the lower mechanism (consisting of cam and roller elements 152, 155 and 151) there is but a single pair of annular cams, i.e., a rotatable power cam and a fixed cam. In the roller actuated mechanism of U.S. Pat. No. 3,369,423, there are two pairs of concentric cams at each position. A second difference is that the annular power cams 52 and 152 in the present application are rotated through but a fraction of one revolution. In the embodiment illustrated wherein three rollers at 120° spacings are used, the power cam is rotated through about 90°, just enough to cause the rollers 54 to move almost to, but not beyond, the crests of the inclines. This is illustrated in FIG. 5 where the upper roll ramp mechanism consisting of elements 51, 54, 55 and 52 are shown in a stretch-out view, i.e., the annular cams 51 and 52 are shown in a line. FIG. 5(a) shows the relative positions of the fixed cam 51 and the movable power cam 52 when the rollers 54 are at the bottoms of the inclines. When the gear-sector portion of the annular power cam 52 is driven rotationally by gear 78 of the roll ramp drive, the power cam 52 moves relative to the fixed cam 51, to the left as illustrated diagrammatically in FIG. 5(b). This causes the three rollers 54 to roll up the three inclines of the fixed cam 51 and also up the three inclines of power cam 52. The fixed cam 51 is fixed in the housing 100 and is unable to move either axially or rotationally. Suitable mechanical stops (not shown) are provided for over-travel protection, i.e., for assuring that the rollers 54 do not pass beyond the crests of the inclines. It will be understood that when the power cam 52 is moved through 90°, as indicated above, the rollers 54 and retainer 55 are moved through one-half the distance, or 45°.

Operation

Figure 6:
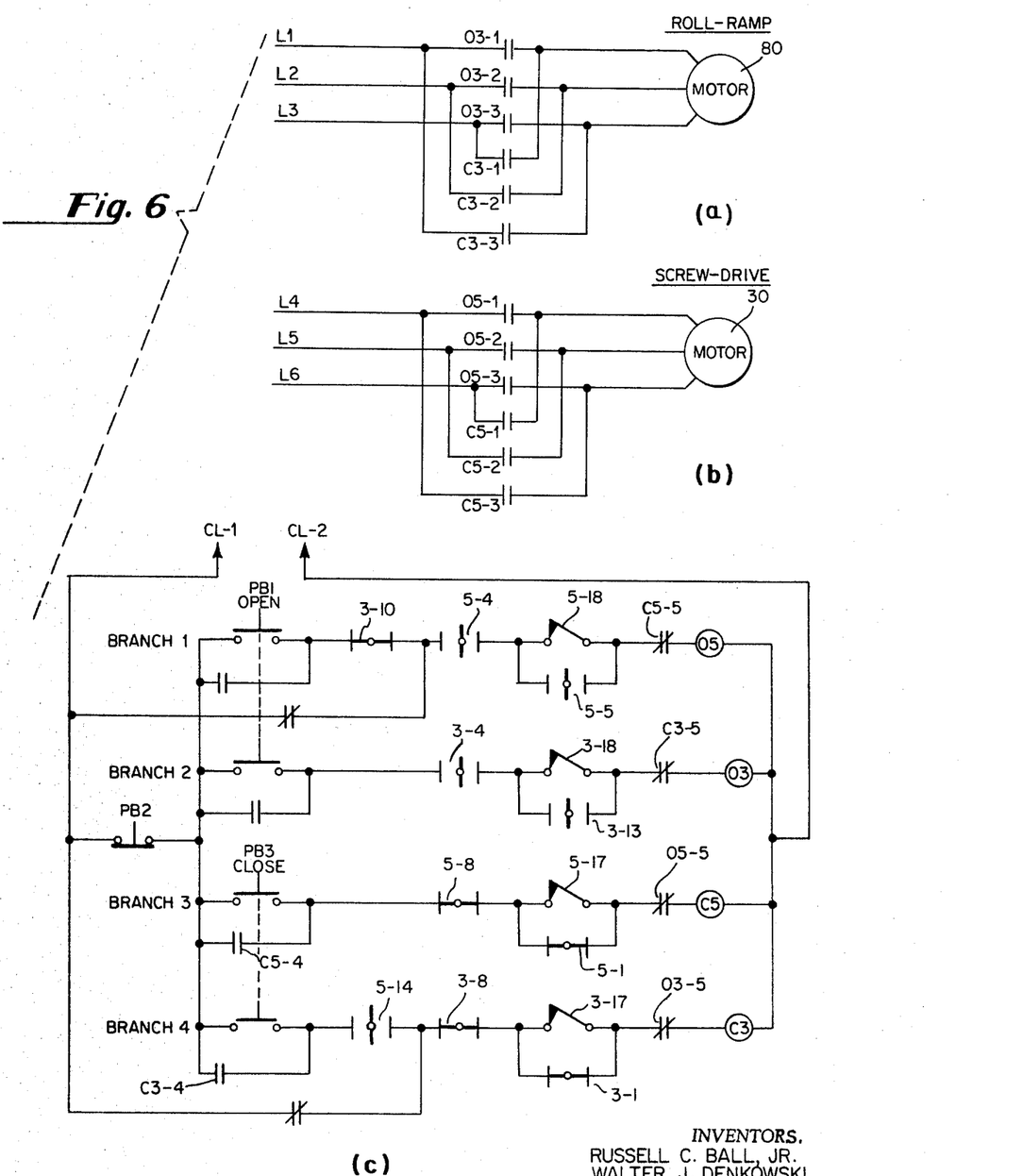
FIG. 6 illustrates diagrammatically the electrical circuits which control the operation of the apparatus.

With the assistance of the electrical circuit diagrams of FIG. 6, the operation of the device will now be described. In FIG. 6, all switches are shown in the conditions they take when the valve is in fully open position. Both of the motors 30 and 80 are at rest.

It will be understood that, by pre-trial, the number of revolutions of the counter shaft 27 (FIG. 4) required to move the valve stem 10 from fully open to almost-closed position has been determined, and that this number has been pre-set into the counter 45. The distance the valve stem 10 has to be moved to move the valve from almost-closed to fully closed position is small, as for example, one to one and one-half inches, and the roll-ramp mechanism is set up to move the valve stem 10 through this distance.

With the valve in fully open position, assume that the attendant wishes to close the valve. To do this, he pushes the push-button switch PB3 (FIG. 6(c). This is a momentary closing switch, the switch PB3 returning to open position as soon as the finger of the operator is removed. When the switch PB3 is closed, a circuit identified as Branch 3 is completed from line CL-1 to line CL-2 through the normally closed stop switch PB2, the switch PB3, the limit switch 5-8, the over-load switch 5-17, the closed contacts 05-5 of the coil 05, and the coil of the relay C5. This energizes relay C5 and with relay C5 thus energized, the relay contacts C5-4 close, thereby closing a shunt circuit around the push button switch PB3 and thereby locking Branch 3 closed so that the opening of push button switch PB3 does not open the circuit through Branch 3.

When the circuit through Branch 3 is completed and the coil of relay C5 is energized, as just described, the three sets of relay contacts C5-1, C5-2, C5-3 in FIG. 6(b) are closed and motor 30 is energized in a direction to drive nut 12 in a direction to move stem 10 downwardly toward valve closing position. This drive, as seen in FIG. 3, is through worm shaft 29, worm 22, worm gear 21, shaft 20, pinion 23, gear 24, key 13, and nut 12. Since nut 12 cannot move axially (except under the conditions, and to the limited extent, later described in connection with the roll-ramp mechanism) the non-rotatable threaded stem 10 moves axially when nut 12 is driven rotationally. This screw type of drive continues until the stem 10 reaches almost-closed or switchover position, at which time a limit switch 5-8 in Branch 3 is reached and moved from closed to open position. This opens the circuit through Branch 3, de-energizes relay coil C5, and the three sets of relay contacts C5-1, C5-2, C5-3, (FIG. 6(b)) open to shut off the motor 30. At this position, the valve is almost, but not quite, closed. Further downward movement of the stem of the order of from one to one and one-half inches is required to fully close the valve, and this movement is against heavy back pressure.

With stem 10 at the switchover position, the attendant again pushes the push-button switch PB3 to momentarily close the switch. Limit switch 5-14 in Branch 4, which had been open throughout the screw drive action described above, is now closed, having become closed when stem 10 reached the switchover position. Accordingly, when push-button switch PB3 is momentarily closed by the attendant, a circuit is completed from line CL-1 to CL-2 through Branch 4 which includes the now-closed limit switch 5-14, the closed over-travel limit switch 3-8, the normally closed over-load switch 3-17, the normally closed contacts 03-5 of the relay coil 03, and the relay coil C3. This energizes relay coil C3.

When the relay coil C3 is energized, the three sets of relay contacts C3-1, C3-2, C3-3 (FIG. 6(a)) close and motor 80 is energized in a valve-closing direction. The relay contacts C3-4, which are in shut across pushbutton switch PB-3, close, thereby locking up the circuit through Branch 4.

Motor 80 now drives the roll-ramp mechanism in a valve-closing direction until the valve becomes fully closed, at which time a torque switch 3-17 in Branch 4 opens. A limit switch 3-1 which bypasses torque switch 3-17 is at this time also in open condition having been opened when the stem 10 reached the switchover position. Thus, the circuit through Branch 4 is opened when the valve becomes fully closed. Relay coil C3 is de-energized, and relay contacts C3-1, C3-2 and C3-3, in FIG. 6(a), open and the roll-ramp motor 80 is de-energized.

Referring now to FIGS. 1-3, the roll-ramp mechanism which is used, as just indicated above, to close fully the valve, operates as follows: Motor 80 drives upper power cam 52 through a chain of elements which includes worm shaft 81, worm 82, worm gear 83, shaft 70, pinion 71, gear 72, stub shaft 73, pinion 74, gear 75, power shaft 77 and upper gear 78 which meshes with drives the gear-sector portion of the upper power cam 52. Simultaneously, the roll-ramp motor 80 is also driving the lower power cam 152 through the lower gear 178 on power shaft 77. The lower gear 178 is in mesh with and drives the gear sector of the lower power cam 152. The motor 80 is, at this time, also driving the upper and lower roller retainers 55 and 155 through gears 79 and 179, respectively. The roller retainers 55 and 155 move through one-half the distance that the gear sectors of the power cams 52 and 152 are moved.

During the valve-closing action now being described, the reversible roll-ramp motor 80 is being driven in a direction to move upper cam 52 in a direction to cause the three rollers 54 of the upper roll-ramp mechanism to move up the inclines of the upper cam 52, and simultaneously to move the lower cam 152 in a direction to cause the three rollers 154 of the lower roll-ramp mechanism to move down the inclines of the lower cam 152.

When, due to the movement of cam 52, the rollers 54 move up the inclines of the cam 52, the rollers also move up the inclines of the stationary cam 51. This is illustrated in FIG. 5 which is a stretched out diagrammatic view of the upper roll-ramp mechanism. FIG. 5(a) illustrates the mechanism in the position which it occupies before the upper power cam 52 is driven. It will be seen that the rollers 54 are at the bottom of the inclines of the cams 52 and 51. Consider, for example, the middle roller in FIG. 5 which has been identified as roller 54-2. At the beginning of the roll-ramp action, the roller 54-2 is at point (d) on power cam 52 and at point (d') on fixed cam 51. When power cam 52 is driven in a rotational direction, to the left as seen in FIG. 5(b), the roller 54-2 climbs up the incline from point (d) towards the crest (c) of the power cam 52, as seen in FIG. 5(b), and at the same time, the roller 54-2 is moved from point (d') of the stationary cam 51 towards the creat point (e'). Power cam 52 is moved through but a fraction of a revolution, preferably at least through 90° but less than 120°, so that the rollers 54 do not move beyond the crests of the cams.

When the rollers 54 move up the inclines of the opposed cams 51 and 52, as just described, a thrust is created in the axial direction of the stem 10 and the power cam 52 is pushed away from the stationary cam 51, thereby increasing the axial distance between the two cams.

Referring now to FIG. 3, it will be seen that when power cam 52 is moved and rollers 54 climb up the cam inclines, stationary cam 51 is prevented from moving upwardy by housing 100. The power cam 52 is, however, permitted to move downward relative to the stationary cam 51. This is because at the lower roll ramp mechanism, the power cam 152 is being simultaneously moved in a direction to cause the lower rollers 154 to roll down the ramps of cams 152 and 151 at the same time that the upper rollers 54 are rolling up the ramps of cams 51 and 52. In other words, at the same time that the upper roll-ramp mechanism is being driven by the gears 78 and 79 in a direction to cause the rollers 54 to roll up the inclines of the cams 52 and 51, the lower roll-ramp mechanism is being driven by the gears 178 and 179 in a direction to cause the rollers 154 to move down the inclines of the lower cams 152 and 151. Thus, at the same time that the spacing between the power cam 52 and stationary cam 51 of the upper roll-ramp mechanism is increasing, the spacing between the power cam 152 and stationary cam 151 of the lower roll-ramp mechanism is decreasing, with lower power cam 152 moving downwardly towards the stationary cam 151.

In FIG. 3, the roll-ramp mechanism are illustrated as being in the positions which they reach when the rollers 54 of the upper roll-ramp mechanism have climbed up the inclines and arrived at their limit positions near the crests, as illustrated diagrammatically in FIG. 5(b). At the lower roll-ramp mechanism, the rollers 154 have rolled down the ramps and power cam 152 has been thrust by the action of the upper roll-ramp mechanism to a position close to fixed cam 151.

In the action just described, when the rotating upper power cam 52 is thrust downwardly by the rollers 54 as they climb up the inclines of the cams 52 and 51, the downward thrust of the cam 52 is transmitted through the thrust bearings 14 and annular plate 15 to nut 12, and thence through plate 115 and bearings 114 to the lower cam 152 and rollers 154. When nut 12 is thrust downward, as just described, it carries with it stem 10, and in this manner the valve is moved from almost-closed to fully closed condition. Thrust bearings 14 and 114 are necessary to take the thrust load and to allow rotation of the power cams.

In the valve closing action just described, the gear sector portions of power cams 52 and 152 move slidingly relative to the drive gears 78 and 178, respectively, and the gear sector portions of the roller retainers 55 and 155 move slidingly relative to the gears 79 and 179, respectively. Similarly, gear 24 moves slidingly relative to drive gear 23.

Assume now that the attendant wants to open the closed valve. When the valve stem 10 is in fully closed position, limit switch 5-4 in Branch 1 of FIG. 6(c) is closed, limit switch 3-4 in Branch 2 is closed, and limit switch 3-10 in Branch 1 is open. When the attendant pushes the push-button switch PB1 to open the valve, a circuit is completed through Branch 2, but not through Branch 1. The closed circuit through Branch 2 comprises the closed limit switch 3-4, the closed over-load switch 3-18, the normally closed contacts C3-5 of relay C3, and the relay coil 03. When the relay coil 03 is thus energized, the three sets of contacts 03-1, 03-2 and 03-3 in FIG. 6(a) close, thereby energizing and driving the roll-ramp motor 80 in a direction to open the valve. The roll-ramp mechanism now operates to lift the nut 12 and valve stem 10 through a distance of an inch or an inch and a fraction to move the stem to the switchover position. At the switchover position, limit switch 3-4 in Branch 2 is engaged and opened, thereby opening the circuit through relay coil 03 and thereby shutting down the roll-ramp motor 80.

To move the stem 10 from the switchover to the fully open position, the attendant again closes the pushbutton switch PB1. This closes the circuit through Branch 1. This circuit includes the now closed limit switch 3-10, the closed limit switch 5-4, the closed overload switch 5-18, the normally closed contacts C5-5 of relay C5, and the relay coil 05. With relay coil 05 thus energized, the three sets of relay contacts 05-1, 05-2 and 05-3 in FIG. 6(b) now close, and the screw drive motor 30 is energized in a direction to drive nut 12 in a direction to lift stem 10 toward fully open position. Motor 30 continues to drive nut 12 to lift stem 10 until the fullyopen position is reached at which time limit switch 5-4 is engaged and opened. This opens the circuit through Branch 1 and relay coil 05 is de-energized, thereby opening the sets of relay contacts 05-1, 05-2, 05-3, and shutting down the motor 30.

In FIG. 6(c), limit switches are shown in shunt across the torque switches 5-18, 3-18, 5-17 and 3-17. Limit switch 5—5 is closed between switchover and fully closed position; limit switch 3-13 is closed at fully closed position; limit switch 5-1 is closed at fully open position; limit switch 3-1 is open between switchover and fully closed position. Torque switches 5-18, 3-18, 5-17 and 3-17 may be operated by well known torque sensing mechanism, as for example, such as is shown in U.S. Pat. No. 2,114,013 issued Apr. 12, 1938 to R.C. Ball.

In the mechanism shown and described, the valve stem 10 remains in the position in which it is placed by the screw drive motor 30, or by the roll-ramp motor 80, despite heavy back pressure, because of the self-locking action of the worm drive. At the time of transfer, i.e., at time of switchover from the screw drive to the roll ramp drive, the entire system is locked by the worms, and a very high back thrust will be on the worms of both drives. Thus, a high torque can be expected. However, the torque sensing mechanism will be set at a sufficiently high value that the torque switches will not normally be operated.

The cam slopes may preferably have contours such as indicated in FIG. 7 wherein the slope is made less steep near the crest. This increases the mechanical advantage of the mechanism and permits full closing of the valve against very heavy back pressures.

In a practical embodiment the distance from the lowest point to the peak of the cam may be of the order of ¾ inch. This provides a total lift of 1½ inch.

It was previously mentioned that in setting up the drive mechanism of the present invention, the number of turns of counter shaft 27 (FIG. 4) to move the stem between fully open and almost closed positions is predetermined by trial. This may be done by the attendant manually turning the handwheel 31 (FIG. 1) to move the valve stem 10 from fully open to fully closed or seated position, and then backing off the desired 1 inch, or fraction of an inch, from seating. By keeping count of the net number of revolutions of the stem between fully open and the almost-closed or switchover position, the attendant can set up the counter 45.

Full closing of the valve, using the roll ramp drive can be sensed by torque sensing equipment associated with worm shaft 81, and operation of the torque switch may be used to shut off the roll-ramp motor 80. On opening the valve from fully closed position, the roll-ramp drive is used to lift the stem 10. A counter may be associated with the roll ramp drive to count the number of revolutions of worm shaft 81 to lift the stem to a desired height (a fraction of an inch or so) above seating. The counter may then operate a limit switch 3–4 to shut off the roll ramp drive motor 80.

While the roll-ramp lifting cams have been shown as being annular in shape, it may be desirable under some conditions to use a linear wedge form of lifting mechanism of the general type shown in U.S. Pat. No. 3,278,158, issued Oct. 11, 1966 to J. A. Saldana. In either case, however, i.e., whether the lifting cams be annular or straight, it is desirable that rolling elements be used between the cam surfaces to provide rolling contact and high efficiency.

What is claimed is:
1. A valve operator comprising:
   a. a housing;
   b. an externally threaded valve stem supported in said housing;
   c. a nut on said valve stem supported in said housing;
   d. first reversible drive means;
   e. a first gear train connecting said first drive means to said nut for driving said nut rotationally thereby to move said stem axially in one direction or the other according to the direction of rotation of said nut;
   f. a pair of roll-ramp units mounted in said housing in opposing relation to each other, one unit on each side of said nut;
   g. each roll-ramp unit comprising a stationary cam surface, a movable cam surface, and roller means providing roller contact between said stationary and movable cam surfaces;
   h. thrust bearing means on each side of said nut between each roll-ramp unit and said nut;
   i. second reversible drive means;
   j. a second gear train connecting said second drive means to said movable cam of each roll-ramp unit by way of a gear sector for concurrently driving said movable cams through but a fraction of one revolution, thereby to drive said roll-ramp units concurrently in opposite manner for exerting thrust against said nut in the axial dirction of said stem, thereby to move said stem axially in one direction or another according to the direction of rotation of said second drive means, the total extent of said movement of said stem by said second drive means being within a distance not exceeding the sum of the rise of said stationary and movable cam surfaces.

2. A valve operator according to claim 1 characterized in that:
   a. first control means, including counter means, are provided operatively associated with said first drive means for controlling said first drive means to drive said stem axially from fully open position to an almost-closed position;
   b. second control means, including torque sensing means, are provided operatively associated with said second drive means for controlling said second drive means for driving said pair of roll-ramp units for moving said stem axially between almost-closed and fully-closed positions.

3. A valve operator according to claim 2 characterized in that:
   a. said stationary cam surface is annular;
   b. said movable cam surface is annular;
   c. said thrust bearing means are mounted between said movable cam surface and said nut, on each side of said nut.

4. A valve operator according to claim 3 characterized in that:
   a. each of said movable annular cam surfaces is integrally connected to a gear sector;
   b. said gear sector is driven by said second gear train for moving said annular cam surface through a fraction of 360°;
   c. said fraction of 360° being less than twice the fraction of 360° represented by one rising incline of said annular cam surface.

5. A valve operator according to claim 4 characterized in that said first and second drive means each includes a worm and gear.

6. A valve operator according to claim 5 characterized in that:
   a. said second drive means drive the movable cam surfaces of both roll-ramp units in the same direction at the same time, and
   b. said pair of opposing roll-ramp units, one on each side of said nut, are so opposingly related that when said movable cam surfaces are driven in the same direction at the same time, said rollers of one unit climb up the cam inclines while the rollers of the other unit roll down the cam inclines.

7. A valve operator according to claim 6 characterized in that said cam surfaces are so contoured that the angle of incline decreases near the crest.

* * * * *